Oct. 27, 1964   J. R. URBANK ETAL   3,154,357
ELECTRIC COOKING APPLIANCE WITH ADJUSTABLE CONTROLS HOUSING
Filed July 23, 1963   2 Sheets-Sheet 2
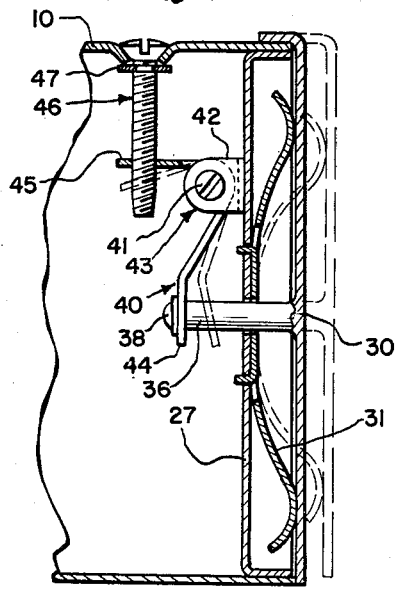
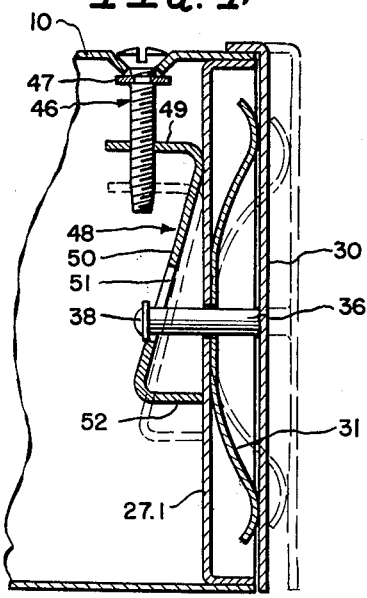
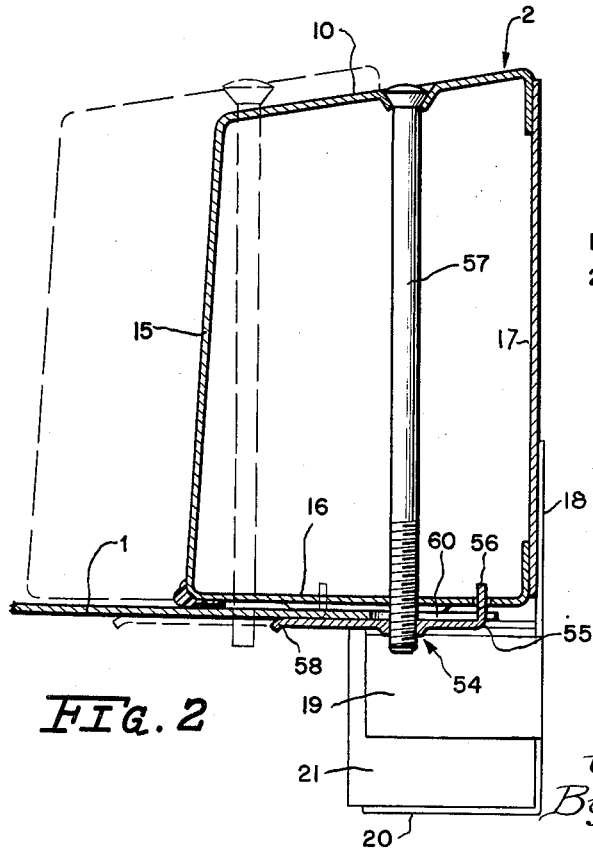
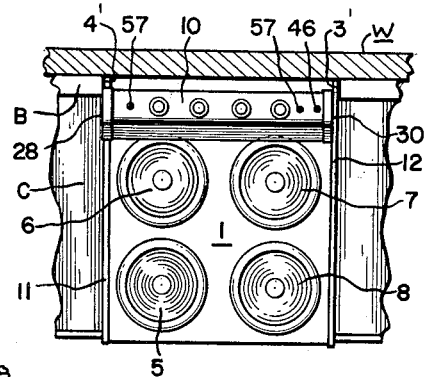
INVENTORS
Philip J. More
Joseph R. Urbank
By Andrew S. Hubbard
Atty.

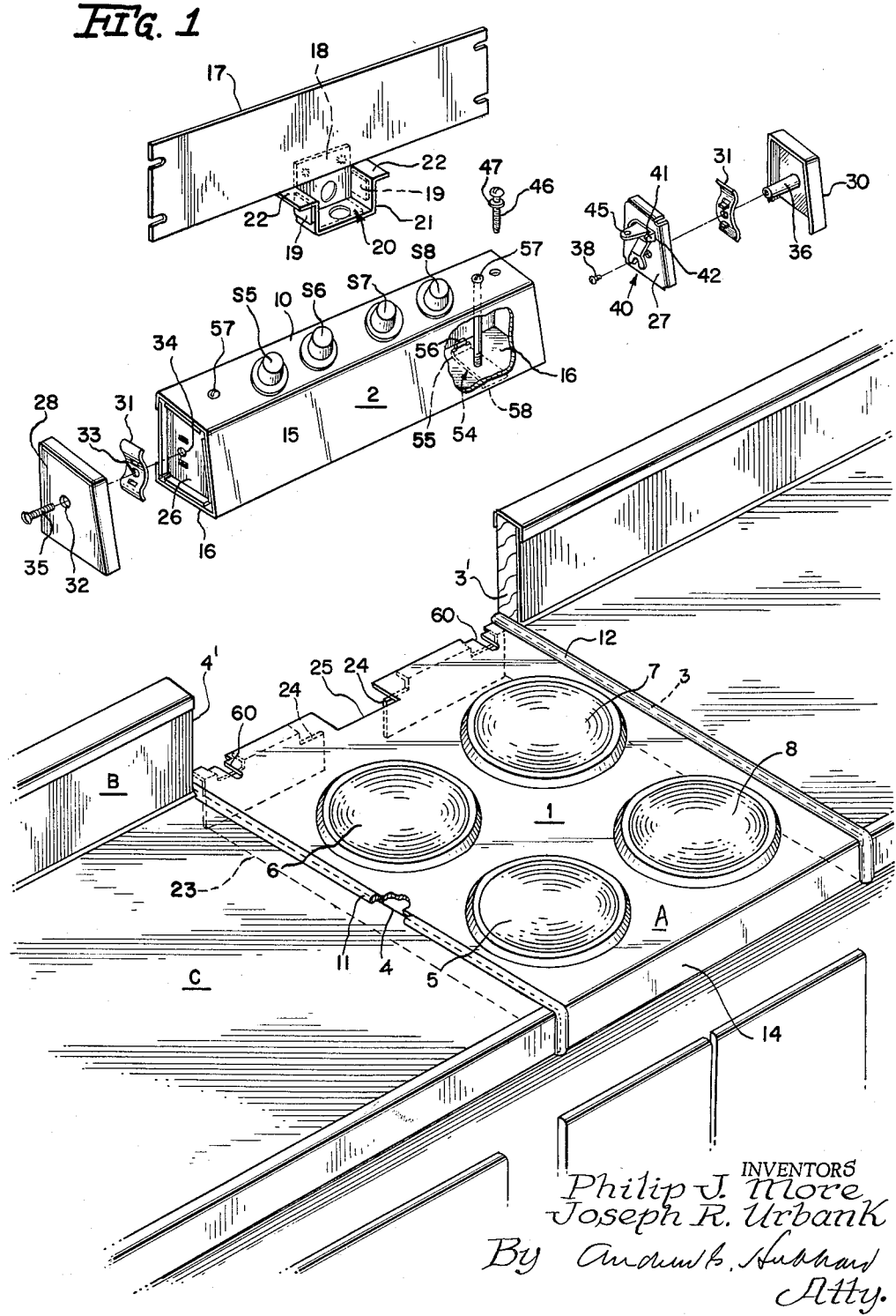

United States Patent Office 3,154,357
Patented Oct. 27, 1964

3,154,357
ELECTRIC COOKING APPLIANCE WITH ADJUSTABLE CONTROLS HOUSING
Joseph R. Urbank, Oak Lawn, and Philip J. More, Evanston, Ill., assignors to General Electric Company, a corporation of New York
Filed July 23, 1963, Ser. No. 297,001
6 Claims. (Cl. 312—111)

This invention relates to electric cooking appliances of the type intended to be installed in a kitchen counter of the conventional type having a horizontal working surface and an upstanding backsplash structure at the rear thereof; and in particular, the invention relates to the provision of a cooking appliance control housing which may be adjusted relative to said backsplash structure and the building wall behind such structure.

It is now very popular to build a cooking appliance, such as a cooking top for surface cookery, or a combination cooking top and oven, into the kitchen counter; in such installations, the requisite portion of the counter, including its working top and backsplash, are removed so that the remaining counter structure may receive and support the cooking appliance. The usual cooking appliance has an upstanding box-like controls housing at the rear of the cooking top, and it is common installation practice to have the controls housing occupy the space resulting from the removal of a portion of the counter backsplash structure.

Although "standard" kitchen counters have a work surface measuring 25 inches from the front edge of the counter to the rear surface of the backsplasher, many are sub-standard and may measure 24 inches or even slightly less from the front edge of the counter to the rear face of the backsplasher. This has presented a substantial design problem for the cooking appliance manufacturer, for he must standardize on his cooking top dimensions in order to obtain the economies of mass production.

Pursuant to our invention we standardize the front-to-rear dimension of the cooking top at 24 inches and provide convenient means for adjusting the controls housing in a forward or rearward direction, whereby our cooking appliance may be accommodated to a countertop structure having an overall depth of as little as 24 inches or as much as 25 inches, each said depth being measured from the front edge of the counter to the rear face of its backsplasher portion. In a preferred form of our invention we make the controls housing a self-contained unit so that it has mobility on the cooking top and provide structurally simple clamping devices by means of which the control housing may be pressed against the building wall and made secure. Further, our invention contemplates an adjustment of the width of the controls housing so that it may snugly engage the adjacent "raw edge" of the cut backsplasher portion.

It is therefore an object of our invention to provide a cooking range or the like with a controls housing which may be adjusted in a front-to-rear direction and also have provisions for adjustment of its length, whereby to accommodate varying sizes of kitchen countertops or slight errors of commission on the part of the workman who prepares the countertop for the installation of the appliance.

It is another object of our invention to provide a cooking appliance providing for adjustment of its overall depth and width, and to provide a simplified mechanism for accomplishing said adjustment.

Other features and advantages will best be understood from the following detailed description of a presently preferred embodiment, read in connection with the accompanying drawings in which:

FIG. 1 is an exploded perspective of a cooking range embodying our invention, with certain portions of the cooking top and control housing broken away to reveal underlying structure;

FIG. 2 is a side sectional elevation of the controls housing and a fragmentary portion of the cooking top showing the controls housing in its most rearward position and indicating the relative position thereof in its most forward position on the cooking top;

FIG. 3 is a side sectional elevation of one end portion of the controls housing showing one form of end cap adjustment;

FIG. 4 is a view similar to FIG. 3 showing a second form of end cap adjustment; and FIG. 5 is a somewhat schematic plan view showing a stage of the installation of the cooking top in a kitchen counter.

Referring now to FIG. 1, C represents a kitchen counter of indefinite length. A backsplash section B defines the rear wall of the counter. In most counter installations the rear face of the backsplash section abuts the adjacent wall W, FIG. 5, of the kitchen.

To accommodate the cooking top portion 1 of the appliance A, and the controls housing 2 with which it is equipped, portions of the counter and backsplash section have been cut out. The countertop cut-out area may extend throughout the depth of the countertop; it will be seen in FIG. 1 that the side marginal edges 3 and 4 of the cut-out extend to the rear of the backsplash B. The cooking top has been shown as an electric appliance having four surface cooking units 5, 6, 7 and 8 of the sheathed electric resistance type sold by applicants' assignee herein under the trademark "Calrod." The respective cooking units are controlled by switching devices, the respective switch knobs S5, S6, S7 and S8 of which are disposed on the upper wall 10 of the controls housing 2.

It will be noted that the side margins of the cooking top have flanges 11 and 12; said flanges also define the side margins of the front wall 14 of the appliance. The purpose of the respective flanges is to conceal the "raw edge" of the counter, and sufficiently to overlap these edges to provide a reasonable margin of error in the width of the countertop cut-out. For convenience in making this cut-out—for frequently the work is done "on the job"—the cut-out extends the full depth of the countertop, as above noted; and in view of the desirability of having the controls housing 2 extend the full width of the cooking top, it is necessary for the cut-out space measured between the backsplash walls 3', 4', to be wider than the countertop cut-out by substantially twice the width of a side marginal flange of the cooking top. This requirement introduces another area in which a careless disregard of detail by the installer may produce a cut-out of excessive width, or one in which the cut-out may not be truly symmetrical with respect to the front-to-rear center line of the countertop cut-out.

The present invention accommodates itself to the normal range of discrepancies in the depth of the countertop; to the normal range of discrepancies in the thickness of the backsplash section B (usually the backsplash section is 1 inch thick, but there is sometimes applied thereto a facing of ceramic tile which may add more than ¼ of an inch of the overall thickness); and to all but serious miscalculations in the necessary cut-outs in the cooking top and backsplash.

The controls housing 2 is an elongated box-like structure in which the top 10, front 15 and base 16 are advantageously one piece of sheet metal. A demountable rear wall 17 has welded thereto a structure 18 having side walls 19 and a base wall. A U-shaped wall 21 having flanges 22 is supported on the structure 18 to provide a terminal or junction box 20. The base 16 of the control housing provides a top wall for the junction box. The box openly faces into the hollow body portion 23 of the cooking appliance, the rear wall 24 thereof being shaped to accommodate the passage of the junction box and the flanges 22 thereof. It is also noted in FIG. 1 that the cooking top 1 has a rectangular aperture 25 which in the assembled appliance registers with a similar aperture (not shown) in the housing base wall 16. This aperture, of course, provides for the passage of the necessary electrical connections from the respective switches to the several surface cooking units.

The enclosure of the controls housing is completed by recessed end plates 26 (FIG. 1) and 27 (FIG. 3) which are fixed to the top, front, and bottom walls of the housing 2. Further, the enclosure is accomplished by the end caps 28 (FIG. 1) and 30 (FIG. 3) which telescope over the adjacent control housing structure and are adjustable relative thereto.

It is desirable to have one end cap self-adjustable and the other manually adjustable. Continuing our examination of FIG. 1, the end cap 28 is biased for movement in a leftward direction by means of the leaf spring 31 which may be clipped or otherwise secured to the end plate 26. The end cap 28 has a recessed screw hole 32 which registers with the hole 33 in the spring and the tapped hole 34 in the plate 26. These holes accommodate the oval headed screw 35 by means of which the end cap is held on the controls housing. Adjustment means for the opposite end cap 30 are shown in two embodiments in FIGS. 3 and 4. In FIG. 3 the end plate 27 has affixed thereto a spring 31 arranged to urge the end cap 30 in a rightward direction, as viewed in the figure. The end cap 30 is advantageously a die casting and is formed with a cylindrical extension 36 which passes freely through openings in the spring 31 and the end plate 27. The member 36 is tapped to receive a screw 38, the head of which is substantially larger in diameter than the member 36.

To accomplish the adjustment of the end cap 30 relative to the controls housing, the FIG. 3 embodiment utilizes a bell crank 40 pivotally mounted on end plate 27 by passage around a screw 41 passing through the spaced ears 42 of a bracket 43 secured to the end plate 27. Leg 44 of the bell crank is forked at its lower end to straddle the member 36; the bias of the spring 31 insures that the head of screw 38 maintains contact with this bell crank leg. Leg 45 of the bell crank is tapped to receive an adjustment screw 46, the thread of said screw being of quite large pitch so as to accomplish the limit of adjustment of the end cap with but one or two turns of the screw. The screw is held against axial displacement relative to the top wall 10 of the control housing by a snap ring 47 or other washer-like device.

In the end cap adjustment of FIG. 4, the end cap 30 and spring 31 are the same as those described above; end plate 27.1 is identical with plate 27 of the FIG. 3 embodiment except for the omission of the pivot bracket 42. The adjustment mechanism comprises a Z-shaped cam 48 having an upper leg 49 threaded to receive the screw 46, a sloping intermediate leg 50 having a slot of sufficient width to accommodate the passage therethrough of the cylindrical member 36, but smaller than the diameter of the head of screw 38, and a bottom leg 52. It will be noted that the outermost end of leg 52 is in vertical alignment with the intersection of the legs 49 and 50, whereby the movement of the cam, according to the direction of rotation of the screw 46, is without tilting or skewing. In FIG. 4 the end cap 30 is in its innermost position. As screw 46 is rotated to cause the cam 48 to move downwardly, the spring 31 urges the end plate in a rightward direction, and the end cap will project to a distance established by the angle of slope of the cam leg 50, and the extent to which the cam 48 is displaced in a vertical direction. Obviously, the end cap may be retracted by a reversal of the direction of movement of the cam 48.

FIG. 2 shows one of two identical clamping devices by means of which the controls housing 2 may be locked in its desired position on the cooking top 1. The full line representation indicates the rearmost position; the broken line representation shows the forwardmost position. In a present embodiment of our invention, the total adjustment is 1¼ inches; this has been found sufficient to accommodate the most frequently encountered discrepancies in kitchen counter construction.

An angular clamping plate 54 has an upward projection 55 having a further extension 56, which latter extension projects through an appropriate opening in the base plate 16 of the control housing. The extension 56, of course, precludes rotation of the plates 54 in the plane of the base 16 while permitting a pivotal action relative thereto. Intermediate its ends, each clamping plate has a tapped opening to receive the locking screw 57, the head of which is exposed at the top plate 10 of the controls housing, as shown. FIG. 2 also shows the slight downward slope of the end 58 of the clamping plate, said slope facilitating the entry of the end portion of the cooking top 1 between the clamping plate and the bottom wall 16 of the housing. As best shown in FIG. 1, the rear edge of the cooking top 1 is preferably notched, as at 60, to accommodate the necessary displacement of the clamping plate and screw in effecting the maximum displacement of the controls housing.

The installation of a cooking appliance embodying our invention is a very simple matter. Assuming the counter and backsplash cut-outs to have been made, and the power leads to have been brought into the conduit box, the controls housing is moved to its maximum forward position with the clamping plates relaxed at this time. The cooking top is aligned with the front edge of the counter, and the end caps 28 and 30 brought to their maximum inward position. The controls housing may then be slid rearwardly until the rearmost portions of the respective end caps have just entered the backsplash cut-out space, see FIG. 5. In this temporary position the screw 35 is readily accessible to the installer who backs off on the screw until the spring 31 projects the end cap 28 into engagement with the adjacent edge of the backsplash B. The controls housing is then moved to its maximum rearward position (which ordinarily will be established by the engagement of the housing against the kitchen wall) and the clamping screws 57 made up to cause the respective clamping plates 54 to come into tight clamping engagement against the cooking top 1. It is usually at this stage that the adjustment screw 46 is manipulated to extend the clamping plate 30 into tight engagement with the adjacent backsplash wall.

While there has been described what is at present thought to be a preferred embodiment of the invention, it will be understood that various modifications may be made therein, and it is intended to cover in the appended claims all such modifications which fall within the true spirit and scope of the invention.

We claim as our invention:

1. A coking appliance adapted for installation in a space provided therefor in an elongated counter having a horizontal working surface and an upstanding backsplash structure at the rear thereof, comprising, in combination:

a rectangular cooking top having flange portions at the respective sides thereof adapted to overlie respectively adjacent edge portions of said counter working surface, an upstanding hollow control housing extending longitudinally of said cooking top at the rear thereof, said housing having a horizontally extending top plate, said control housing having a horizontally extending bottom plate adapted to rest on said cooking top for movement of the housing thereon in a forward or rearward direction, and means for securing said housing in desired position, including a clamping plate pivotally secured at one end to said housing bottom plate and constrained thereby for rotation in a vertical plane, said clamping plate and said bottom plate being arranged to receive between them a portion of said cooking top, and a screw passing through the top wall of said control housing into threaded engagement with said clamping plate whereby according to the direction of rotation of said screw said clamping plate will be rotated in one or another direction, whereby said housing may be manually positioned on said cooking top and said screw subsequently manipulated to cause said clamping plate to tightly confine said cooking top between it and said housing bottom wall.

2. A cooking appliance adapted for installation in a space provided therefor in an elongated counter having a horizontal working surface and an upstanding backsplash structure at the rear thereof, comprising, in combination:

a rectangular cooking top having flange portions at the respective sides thereof adapted to overlie respectively adjacent edge portions of said counter working surface, wall means at the rear of said cooking top, said wall means being in mutually spaced parallel relation and normal to the front edge of said cooking top, an upstanding hollow control housing extending longitudinally of said cooking top at the rear thereof, said housing having a horizontally extending top plate, said control housing having a horizontally extending bottom plate adapted to rest on said cooking top for movement thereon in a forward or rearward direction, and means for guiding said housing in such movement and for securing said housing in desired position, including a clamping plate pivotally secured at one end to said housing bottom plate and constrained thereby for rotation in a vertical plane, said clamping plate and said bottom plate being arranged to receive between them a portion of said cooking top, a screw passing through the top wall of said control housing into threaded engagement with said clamping plate whereby according to the direction of rotation of said screw said clamping plate will be rotated in one or another direction, and an electrical terminal box extending from said bottom plate into slidable relation with said cooking top wall means, whereby said housing may be manually located on said cooking top in parallel relation to the front edge thereof and said screw subsequently manipulated to cause said clamping plate to tightly confine said cooking top between it and said housing bottom wall.

3. The combination according to claim 2, in which said cooking top is apertured to slidably receive said terminal box.

4. A cooking appliance adapted for installation in a space provided therefor in an elongated counter having a horizontal working surface and an upstanding backsplash structure at the rear thereof, comprising, in combination:

a rectangular cooking top having flange portions at the respective sides thereof adapted to overlie respectively adjacent edge portions of said counter working surface, an upstanding hollow control housing extending longitudinally of said cooking top at the rear thereof, said housing having a horizontally extending top plate, said control housing having a horizonally extending bottom plate adapted to rest on said cooking top for movement thereon in a forward or rearward direction, and means for adjusting the position of said housing relative to said backsplash structure, including a clamping plate pivotally mounted at one end on said housing bottom plate and constrained thereby for rotation in a vertical plane, said clamping plate and said bottom plate being arranged to receive between them a portion of said cooking top, a screw accessible externally of said control housing and passing into threaded engagement with said clamping plate whereby following manual positioning of said housing relative to said counter backsplash structure said screw may be manipulated to effect a clamping action of said clamp plate on said cooking top, at least one end cap on said housing disposed for longitudinal displacement relative thereto, and means operable externally of said housing for effecting longitudinal displacement of said end cap to establish the desired relationship between said end cap and the adjacent backsplash structure.

5. A cooking appliance adapted for installation in a space provided therefor in an elongated counter having a horizontal working surface and an upstanding backsplash structure at the rear thereof, comprising, in combination:

a rectangular cooking top having flange portions at the respective sides thereof adapted to overlie respectively adjacent edge portions of said counter working surface, an upstanding hollow control housing extending longitudinally of said cooking top at the rear thereof, said housing having a horizontally extending top plate, said control housing having a base structure adapted for support on said cooking top for movement thereon in a forward or rearward direction, and means for adjusting the position of said housing in desired relation to said backsplash structure, including a clamping plate pivotally secured at one end to said housing base structure and constrained thereby for rotation in a vertical plane, said clamping plate and said base structure being arranged to receive between them a portion of said cooking top, a screw accessible externally of said control housing and passing into threaded engagement with said clamping plate whereby following manual positioning of said housing relative to said counter backsplash structure said screw may be manipulated to effect a clamping action of said clamp plate on said cooking top, an end cap at each end of said housing, spring means associated with each said end cap for biasing the respective caps in a longitudinally outward direction relative to said housing, and means operable externally of said housing for adjustably opposing the spring bias of said caps to establish a desired displacement of said caps.

6. A cooking appliance adapted for installation in a space provided therefor in an elongated counter having a horizontal working surface and an upstanding backsplash structure at the rear thereof, comprising, in combination:

a rectangular cooking top having flange portions at the respective sides thereof adapted to overlie respectively adjacent edge portions of said counter working surface, an upstanding hollow control housing extending longitudinally of said cooking top at the rear thereof, said housing having a horizontally extending top plate, said control housing having a base structure adapted for support on said cooking top for movement thereon in a forward or rearward direction, and means for adjusting the position of said housing relative to said backsplash structure, including a clamping plate pivotally secured at one end to said housing base structure and constrained thereby for rotation in a vertical plane, said clamping plate and said base structure being arranged to receive between them a portion of said cooking top, a screw accessible at the top plate of said control housing and passing therethrough into threaded engagement with said clamping plate whereby following manual positioning of said housing relative to said counter backsplash structure said screw may be manipulated to effect a clamping action of said clamp plate on said cooking top, at least one end cap arranged in telescoping association with said housing for longitudinal displacement relative thereto, spring means for biasing said end cap into movement longitudinally outwardly of said housing, and screw means accessible at the top plate of said control housing for effecting desired displacement of said end cap relative to said control housing.

References Cited in the file of this patent
UNITED STATES PATENTS

| | | |
|---|---|---|
| 2,576,409 | Michaelis et al. | Nov. 27, 1951 |
| 2,980,480 | Jacobs et al. | Apr. 18, 1961 |
| 3,001,844 | Spring | Sept. 26, 1961 |